April 2, 1940.                    J. E. MEYER                    2,195,823
METHOD OF PRODUCING FOLDED PRODUCTS WITH BLEED COLOR PAGES FACING EACH OTHER
                    Filed Jan. 4, 1939            7 Sheets-Sheet 1

INVENTOR
Joseph E. Meyer
BY
ATTORNEYS

April 2, 1940.   J. E. MEYER   2,195,823

METHOD OF PRODUCING FOLDED PRODUCTS WITH BLEED COLOR PAGES FACING EACH OTHER

Filed Jan. 4, 1939   7 Sheets-Sheet 3

INVENTOR
Joseph E. Meyer
BY
ATTORNEYS

April 2, 1940.   J. E. MEYER   2,195,823
METHOD OF PRODUCING FOLDED PRODUCTS WITH BLEED COLOR PAGES FACING EACH OTHER
Filed Jan. 4, 1939   7 Sheets-Sheet 4

INVENTOR
Joseph E. Meyer
BY
ATTORNEYS

April 2, 1940. J. E. MEYER 2,195,823
METHOD OF PRODUCING FOLDED PRODUCTS WITH BLEED COLOR PAGES FACING EACH OTHER
Filed Jan. 4, 1939 7 Sheets-Sheet 6

INVENTOR
Joseph E. Meyer
BY
Brown & Seward
ATTORNEYS

April 2, 1940.  J. E. MEYER  2,195,823
METHOD OF PRODUCING FOLDED PRODUCTS WITH BLEED COLOR PAGES FACING EACH OTHER
Filed Jan. 4, 1939  7 Sheets-Sheet 7

INVENTOR
Joseph E. Meyer
BY
ATTORNEYS

Patented Apr. 2, 1940

2,195,823

UNITED STATES PATENT OFFICE 2,195,823

METHOD OF PRODUCING FOLDED PRODUCTS WITH BLEED COLOR PAGES FACING EACH OTHER

Joseph E. Meyer, Westerly, R. I., assignor to C. B. Cottrell & Sons Company, Westerly, R. I., a corporation of Delaware Application January 4, 1939, Serial No. 249,256

10 Claims. (Cl. 270—4)

In printing bleed pages on traveling wide webs, slitting the wide webs into narrow webs, associating the narrow webs and folding and delivering the sheets cut from the narrow webs, it has been often desirable to have the so-called bleed pages occupy predetermined positions in the delivered products, as, for instance, two bleed pages facing each other.

The term "bleed page" as now commonly used in the printing art means a page on which some or all of the printed matter extends entirely to one or more edges of the page, thereby eliminating the usual unprinted margin or margins at that or those portions of the page.

The spacing of the bleed page plates is important because if bleed plates were arranged adjoining each other the reciprocation of the distributing rolls of the inking mechanisms for the respective form cylinders would transfer some ink from each of the fountains or divisions thereof to each plate on the cylinder. This would result in a surplus of ink on the plate edges and if the inks were of different colors the disastrous effect on the printed matter would be obvious.

The printing of these bleed pages permits the matching of two opposite bleed pages, each carrying a part of the printed subject because the two impressions are not separated to any considerable degree by unprinted margin. This continuous printed impression is particularly desirable to advertisers who wish the entire page utilized and to illustrators who do not wish to be limited to one page in their illustration.

This present invention is directed to a method which consists in printing bleed pages in one or more colors on portions of a wide web which are spaced from one another both laterally and longitudinally of the wide web, and, if desired, in staggered relationship; slitting the wide web into a plurality of narrow webs, all, or certain, or alternate webs bearing the bleed pages; so associating the narrow webs that the bleed pages will occupy predetermined positions with respect to one another in the final product, cutting the sheets from the narrow webs, folding the sheets and delivering them either to packers or to traveling endless carrier deliveries, or to both types of deliveries.

My method may be carried out by various mechanisms, that shown and described herein forming the subject matter of my copending application filed of even date herewith, its serial number being 249,255 which mechanism comprises, generally, a printing press including form cylinders in which the bleed page printing plates occupy laterally and circumferentially spaced positions to print on a wide web; so that all, or certain, or alternate narrow webs will bear the bleed pages; means being employed to pass the narrow webs through various paths to coacting associating rolls and from thence through the sheet cutting, folding, and delivery elements.

Figure 1:
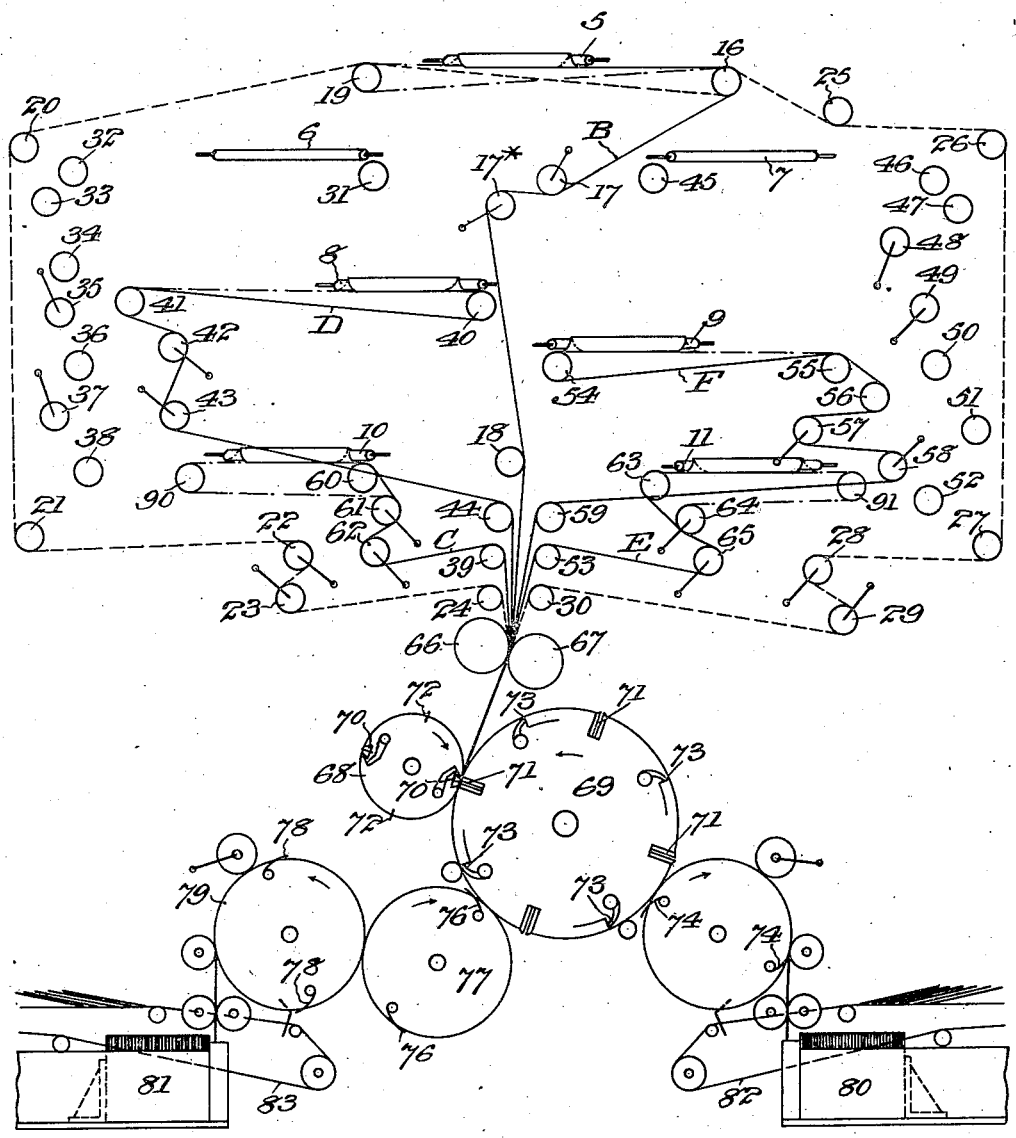
Fig. 1 represents a diagrammatic vertical section taken in the plane of the line I—I of Fig. 2, looking in the direction of the arrows with certain of the guide rollers omitted.
Figure 2:
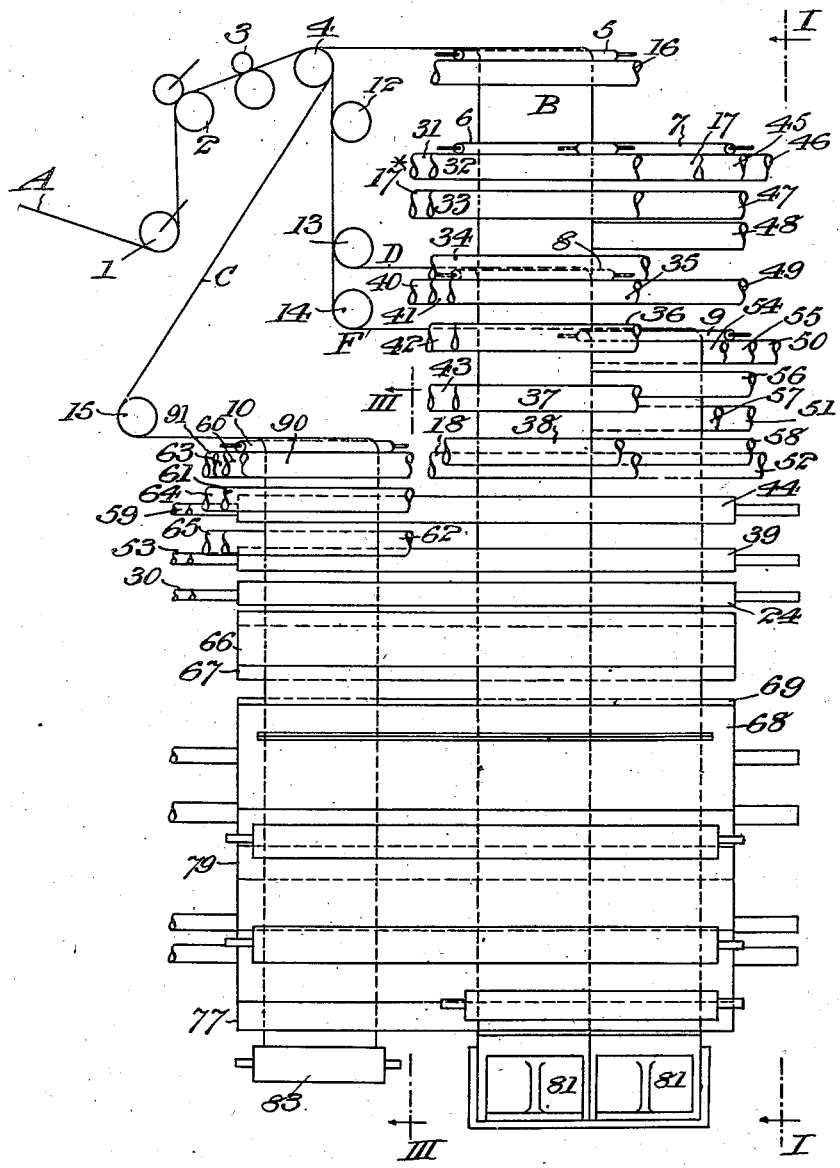
Fig. 2 represents an end view of the same with the guide rollers for the alternate paths of one of the narrow webs omitted.
Figure 12:
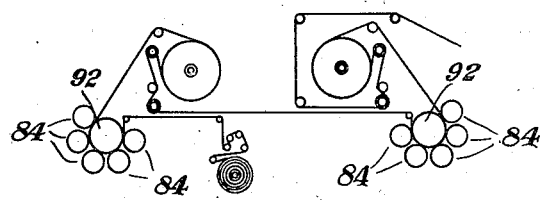
Fig. 12 represents a diagrammatic side elevation on a reduced scale of a multicolor printing press including five form cylinders in each printing unit.
Figure 3:
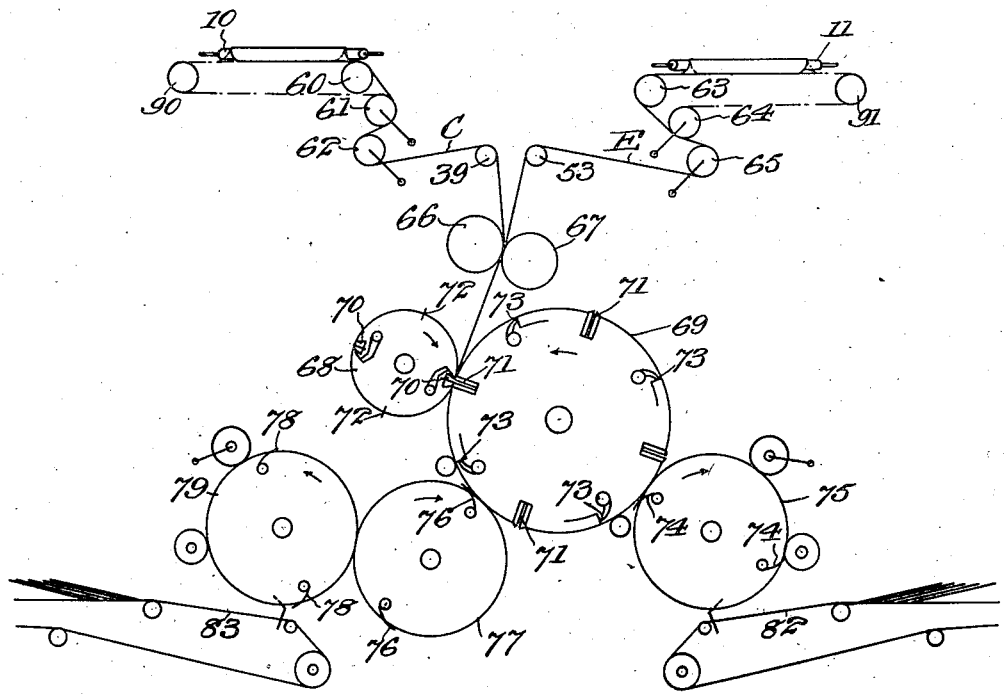
Fig. 3 represents a longitudinal vertical section taken in the plane of the line III—III of Fig. 2, looking in the direction of the arrows.

The impression cylinders are denoted herein by 92, 92 and their respective form cylinders which are arranged to coact therewith in the usual manner are denoted by 84.

After the printing operation in which the wide web A is printed with bleed pages, of one or more colors, spaced laterally and longitudinally, the web, which is herein shown as five pages wide, is engaged by rollers 1, 2 on its way to the slitting mechanism 3 where it is divided longitudinally into five narrow webs B, C, D, E, F. These narrow webs are engaged by the roller 4 and from thence, according to the final relative positions of the narrow webs, they are passed in different selected paths around certain of the turning bars 5 to 11 inclusive, and certain of the guide rolls 12 to 65 inclusive, to the coacting narrow web associating rollers 66, 67. From thence the associated narrow webs pass to the coacting cutting and folding cylinders 68, 69, where the narrow webs are cut into two page lengths by one of the pairs of coacting cutting blocks and knives 70, 71.

The groups of sheets are then folded onto the cylinder 69 by one of the pairs of coacting tucking blades 72 and folding jaws 73.

The folded various sized products to be delivered to the selected delivery or deliveries at one end of the folder are taken from the folding jaws 73 of the cutting and folding cylinder 69 by the proper set of grippers 74 on the delivery cylinder 75. The folded sheets of various sized products to be delivered to the selected delivery or deliveries at the other end of the folder are taken from the folding jaws 73 on the cutting and folding cylinder 69 by the grippers 76 on the transfer cylinder 77 and transferred thereby to the grippers 78 on the delivery cylinder 79.

These cylinders 75, 77, 79 rotate at a slower surface speed than the cylinders 68, 69, to permit the accurate delivery of the various sized products to their selected deliveries.

In the present instance I have shown the cylinder 68 as provided with two equally spaced cutting blocks 70 and two equally spaced tucking blades 72, and the cylinder 69 as provided with four equally spaced cutting knives 71 and four equally spaced folding jaws 73; the cylinder 69 being twice the diameter of the cylinder 68.

The deliveries are herein shown as a double packer and a single endless carrier, arranged side by side across the folder at each end thereof, the double packer deliveries being denoted by 80, 81 and the traveling endless carriers by 82, 83.

The form cylinder, which may be one of a number of form cylinders of a multicolor printing press, is denoted by 84 and the bleed page printing plates, which are spaced apart both longitudinally and circumferentially, are denoted by 85, 86, 87. In the present instance, the bleed page plates 85 print upon the portion of the wide web A which afterwards becomes the middle narrow web B. The bleed page plates 86 print upon the portion of the wide web A which afterwards becomes the narrow web C and the bleed page plates 87 print upon the portion of the wide web A which afterwards becomes the narrow web E.

In this arrangement alternate narrow webs bear bleed pages of one or more colors, which bleed pages in this instance have their printed matter extending entirely to all four edges of the page in the final product.

The non-bleed page plates are denoted by 90, 91, 92, 93 and 94; the dotted lines indicating the division between the printing surfaces of the plates and the non-printing margins of the plates.

Figure 8:
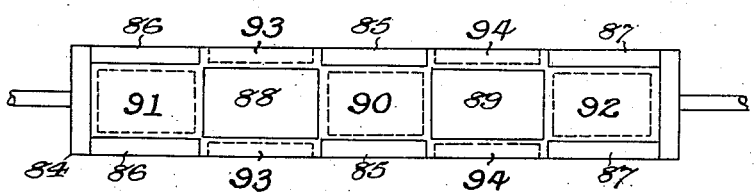
Fig. 8 represents in side elevation the form cylinder shown in Figs. 6 and 7 with an increased number of bleed page plates arranged in staggered relationship as well as spaced both longitudinally and circumferentially on the cylinder, so that all the narrow webs will bear bleed pages.
Figure 9:
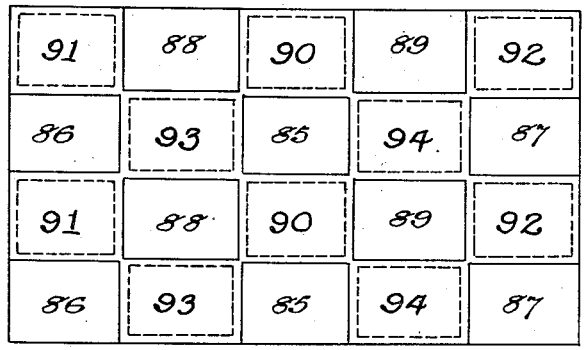
Fig. 9 represents a development of the surface of the said form cylinder to show more clearly the relative positions of the several bleed page printing plates.
Figure 10:
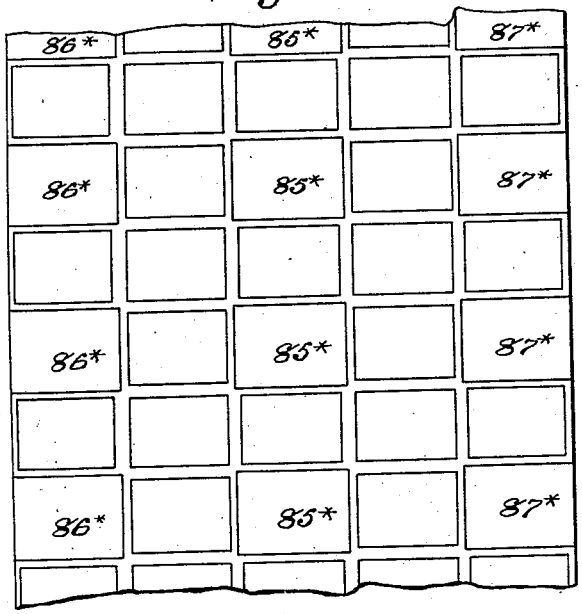
Fig. 10 represents a face view of a fragment of the traveling web as printed by the plate cylinder shown in Fig. 6, the bleed pages being spaced both laterally and longitudinally on the web but not in staggered order.
Figure 11:
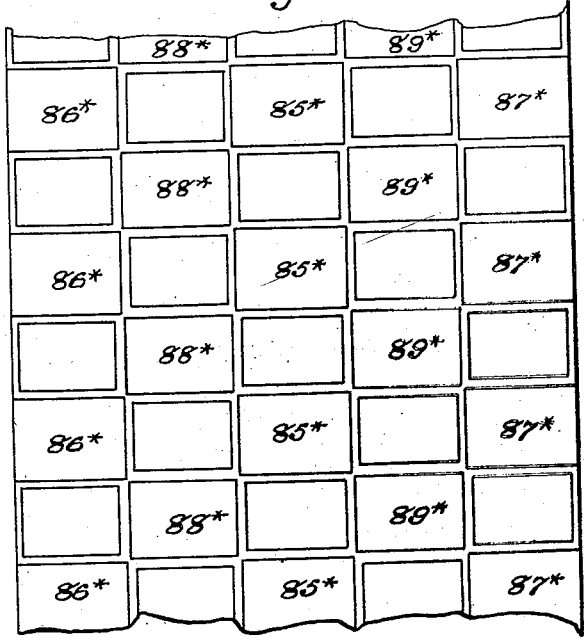
Fig. 11 represents a face view of a fragment of the traveling web as printed by the plate cylinder shown in Fig. 8, the bleed pages being spaced both laterally and longitudinally on the web in staggered order.

The bleed pages printed by the bleed page plates 85, 86, 87 on the traveling web are denoted by 85*, 86* and 87* respectively. In Figs. 8 and 9 additional bleed plates 88, 89 are provided on the form cylinder to produce a staggered relationship of the bleed page plates while still maintaining their spaced relationship both longitudinally and circumferentially of the cylinder. Therefore, these plates 88, 89 are arranged to print on the portions of the wide web which afterwards becomes the narrow webs D, F, respectively; the bleed pages being denoted by 88* and 89*. In this arrangement all of the narrow webs bear bleed pages of one or more colors, which bleed pages in this instance also have their printed matter extending entirely to all four edges of the page in the final product.

It will be noted that the web guide rollers 17, 17*—22, 23—28, 29—35, 37—42, 43—48, 49—57, 58—61, 62 and 64, 65 for the several narrow webs are compensator rollers which rollers may be swung to change, i. e., lengthen or shorten, the travel of the several narrow webs so as to bring any two of their bleed pages into facing relationship with each other in the final product, irrespective of the location of the bleed page printing plates on the form cylinders. In other words, the relation of the cut and the fold may be changed with respect to the position of the bleed page plates on the form cylinders to accomplish the result desired in the final product.

Figure 6:
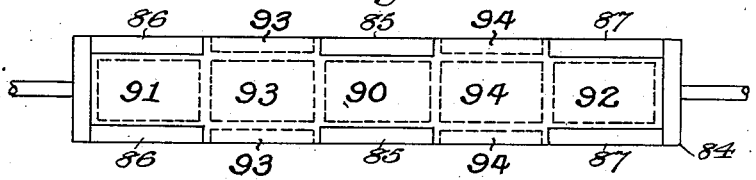
Fig. 6 represents in side elevation one of the form cylinders of a multicolor printing press, the product of which is handled by the folder, the bleed page printing plates being shown spaced from one another both circumferentially and longitudinally on the cylinder, so that alternate narrow webs only will bear bleed pages.
Figure 7:
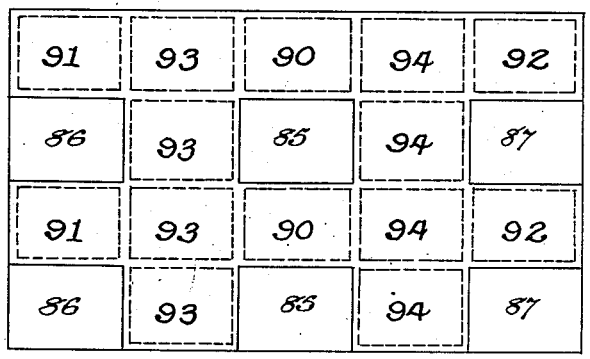
Fig. 7 represents a development of the surface of the said cylinder to show more clearly the relative positions of the several bleed page printing plates.

It will be seen that in the arrangement shown in Figs. 6 and 7, the narrow webs B, C and E with their bleed pages may be passed through different desired paths to bring them into predetermined positions with respect to one another as, for instance, two of the bleed pages facing each other in the final products. In Fig. 1, I have shown in full lines the narrow web B on which the bleed plates 85 have printed, as passing from the roller 16 to be guided by the rollers 17, 18 for occupying a position in the middle of the associated webs. I have also shown in dotted lines the narrow web B as passing to the right in Fig. 1 from the roller 16 to be guided by the rollers 25 to 30 inclusive, for occupying an exterior position on one side of the associated narrow webs, and as passing from the roller 16 to the left in Fig. 1 to be guided by the rollers 19 to 24 inclusive, for occupying an exterior position on the opposite side of the said associated narrow webs.

By reversing the position of the turning bar 5, the narrow web B is shown in Fig. 1 in dot and dash lines as being led to the roller 19 and from thence to and around the roller 16 to reverse the web, to obtain another bleed page combination in the final product.

I have also shown the narrow webs C and E which bear the bleed pages from the plates 86 and 87 as passing through different paths to bring their bleed pages into different selected positions in the final products.

Further combinations may be made by reversing one or more of the other turning bars as indicated by dot and dash lines in Fig. 1, and the use of the additional rollers 90 and 91 adjacent the turning bars 10 and 11.

Figure 4:
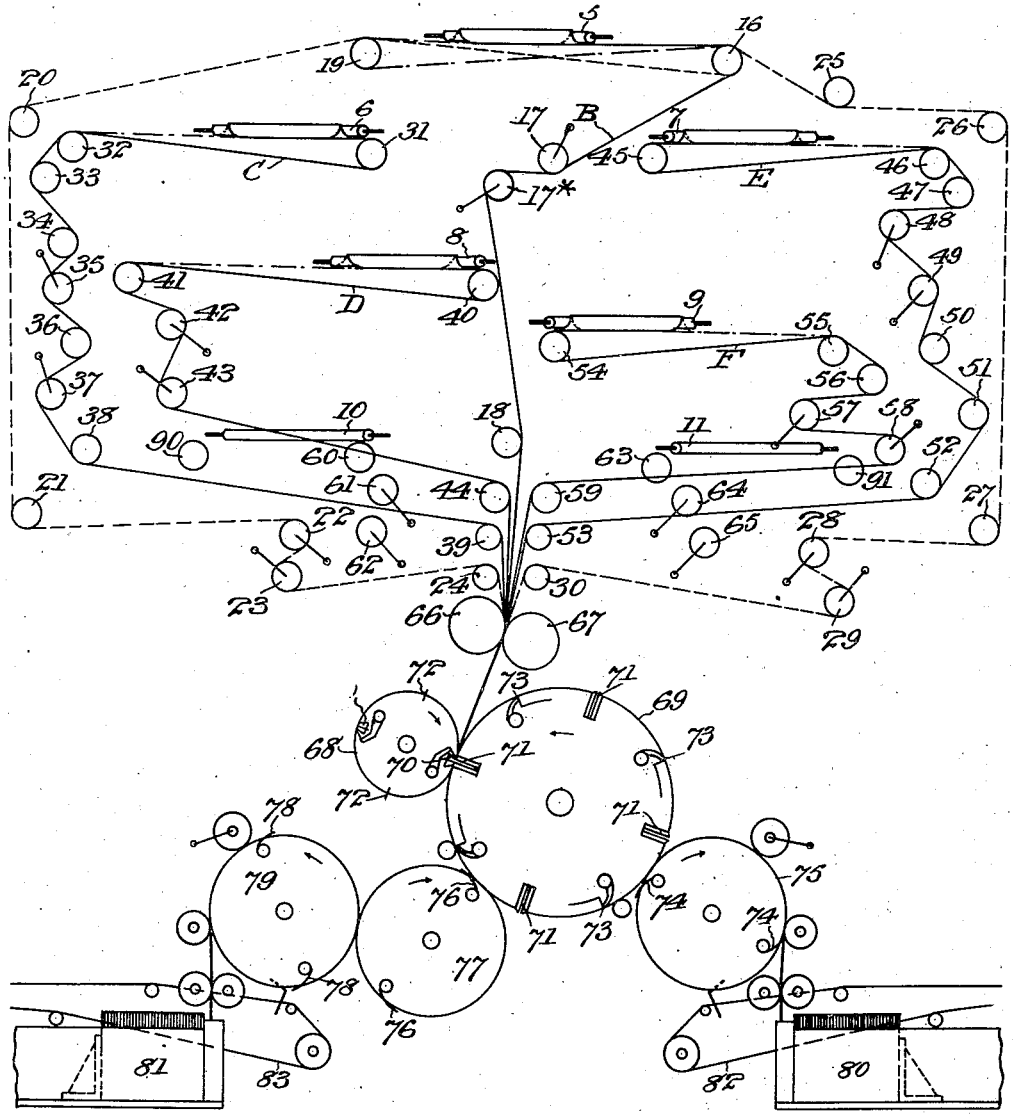
Fig. 4 represents a diagrammatic vertical section taken in the plane of the line IV—IV of Fig. 5, looking in the direction of the arrows, when the products are delivered to the packers only.
Figure 5:
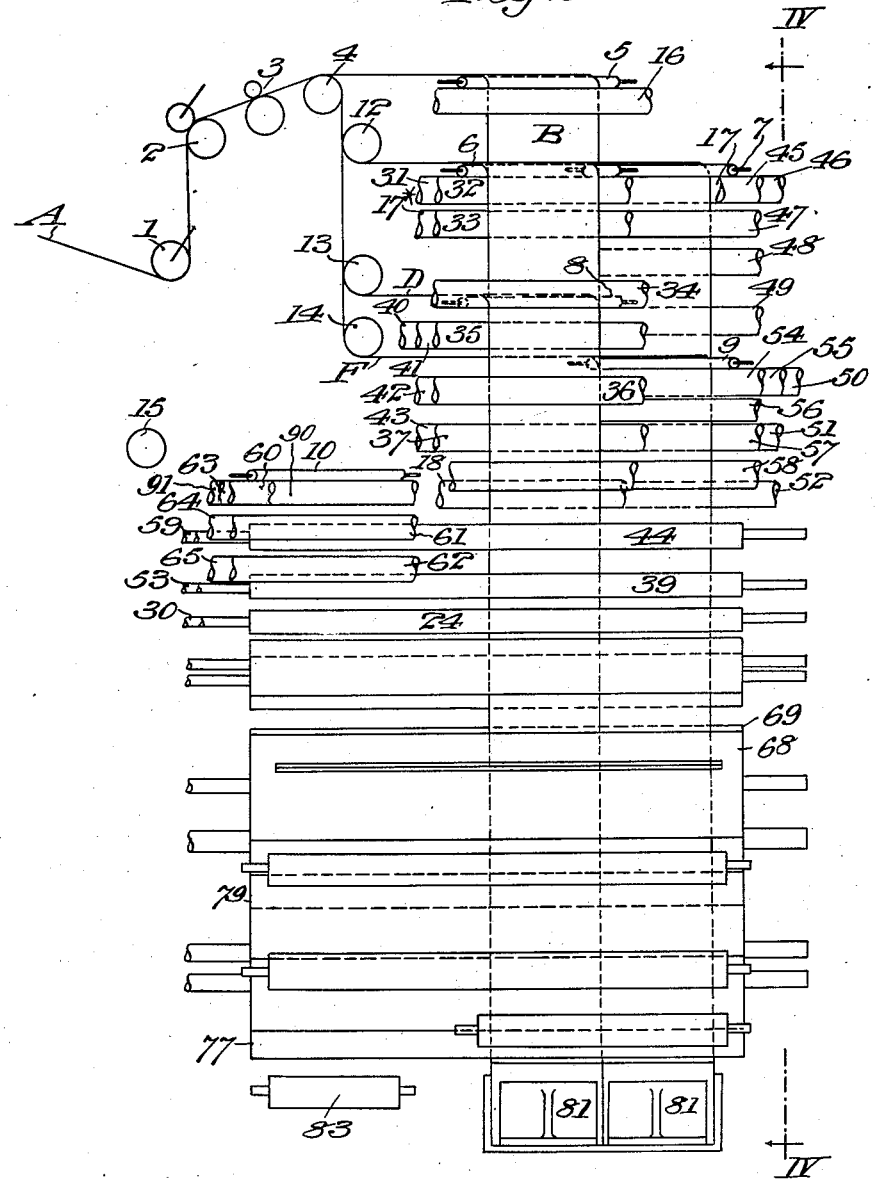
Fig. 5 represents an end view of the same with the guide rollers for the alternate paths of one of the narrow webs omitted.

In Fig. 1, the narrow web C leads from the turning bar 10 to be engaged by the rollers 60, 61, 62, 39 on its way to the associating rollers 66, 67, in line with the endless delivery carriers 82, 83; while in Fig. 4, the web C leads from the turning bar 6 to be engaged by the rollers 31 to 39 inclusive, on its way to the associating rollers 66, 67 in line with the packer deliveries 80 and 81.

Also, in Fig. 1, the narrow web E is shown as leading from the turning bar 11 to be engaged by the rollers 63, 64, 65, 53 on its way to the associating rollers 66, 67, in line with the endless delivery carriers 82, 83; while in Fig. 4, the web E is shown as leading from the turning bar 7 to be engaged by the rollers 45 to 53 inclusive, on its way to the associating rollers 66, 67 in line with the packer deliveries 80, 81.

The parts shown and described herein are shown and described in my copending applications 249,255 and 249,257.

In practice, it is intended that the heavy and light products should be delivered in opposite directions side by side to the packers and the traveling endless carriers respectively, or, if they are all heavy products, to the packers only, or, if they are all light products, to the endless carriers only.

What I claim is:

1. The method which consists in printing bleed pages in one or more colors on laterally and longitudinally spaced portions of a wide web, slitting the wide web into a plurality of narrow webs, associating the narrow webs to bring the bleed pages in predetermined positions in the final product, cutting sheets from the associated narrow webs, folding said sheets and delivering them.

2. The method which consists in printing bleed pages in one or more colors in staggered order on laterally and longitudinally spaced portions of a wide web, slitting the wide web into a plurality of narrow webs, associating the narrow webs to bring the bleed pages in predetermined positions in the final product, cutting sheets from the associated narrow webs, folding said sheets and delivering them.

3. The method which consists in printing bleed pages in one or more colors on laterally and longitudinally spaced portions of a wide web, alternate narrow webs bearing bleed pages, associating the narrow webs to bring the bleed pages in predetermined positions in the final product, cutting sheets from the associated narrow webs, folding said sheets and delivering them.

4. The method which consists in printing bleed pages in one or more colors on laterally and longitudinally spaced portions of a wide web, slitting the wide web into a plurality of narrow webs, reversing one or more of the narrow webs, associating the narrow webs to bring the bleed pages in predetermined positions in the final product, cutting sheets from the associated narrow webs, folding said sheets and delivering them.

5. The method which consists in printing bleed pages in one or more colors on laterally and longitudinally spaced portions of a wide web, slitting the wide web into a plurality of narrow webs, changing the length of travel of one or more of the narrow webs, associating the narrow webs to bring the bleed pages in predetermined positions in the final product, cutting sheets from the associated narrow webs, folding said sheets and delivering them.

6. The method which consists in printing bleed pages in one or more colors on laterally and longitudinally spaced portions of a wide web, slitting the wide web into a plurality of narrow webs, reversing one or more narrow webs and changing their length of travel, associating the narrow webs to bring the bleed pages in predetermined positions in the final product, cutting sheets from the associated narrow webs, folding said sheets and delivering them.

7. The method which consists in printing bleed pages in one or more colors on laterally and longitudinally spaced portions of a wide web, slitting the wide web into a plurality of narrow webs, associating the narrow webs to bring two bleed pages facing each other in the final product, cutting sheets from the associated narrow webs, folding said sheets and delivering them.

8. The method which consists in printing bleed pages in one or more colors in staggered order on laterally and longitudinally spaced portions of a wide web, slitting the wide web into a plurality of narrow webs, associating the narrow webs to bring two bleed pages facing each other in the final product, cutting sheets from the associated narrow webs, folding said sheets and delivering them.

9. The method which consists in printing bleed pages in one or more colors on laterally and longitudinally spaced portions of a wide web, slitting the wide web into a plurality of narrow webs, associating the narrow webs to bring the bleed pages in predetermined positions in the final product, cutting sheets from the associated narrow webs, folding said sheets and delivering them side by side to packer and endless carrier deliveries.

10. The method which consists in printing bleed pages in one or more colors in staggered order on laterally and longitudinally spaced portions of a wide web, slitting the wide web into a plurality of narrow webs, associating the narrow webs to bring the bleed pages in predetermined positions in the final product, cutting sheets from the associated narrow webs, folding said sheets and delivering them side by side to packer and endless carrier deliveries.

JOSEPH E. MEYER.

DISCLAIMER 2,195,823.—*Joseph E. Meyer*, Westerly, R. I. METHOD OF PRODUCING FOLDED PRODUCTS WITH BLEED COLOR PAGES FACING EACH OTHER. Patent dated April 2, 1940. Disclaimer filed June 15, 1940, by the assignee, *C. B. Cottrell & Sons Company*.

Hereby enters this disclaimer to that part of the claim in said specification, as follows:

By disclaiming from claim 3 any method that does not include the step of slitting the wide web into a plurality of narrow webs the alternate narrow webs bearing bleed pages, before the association of the narrow webs.

[*Official Gazette July 9, 1940.*]